United States Patent Office 3,554,566
Patented Jan. 12, 1971

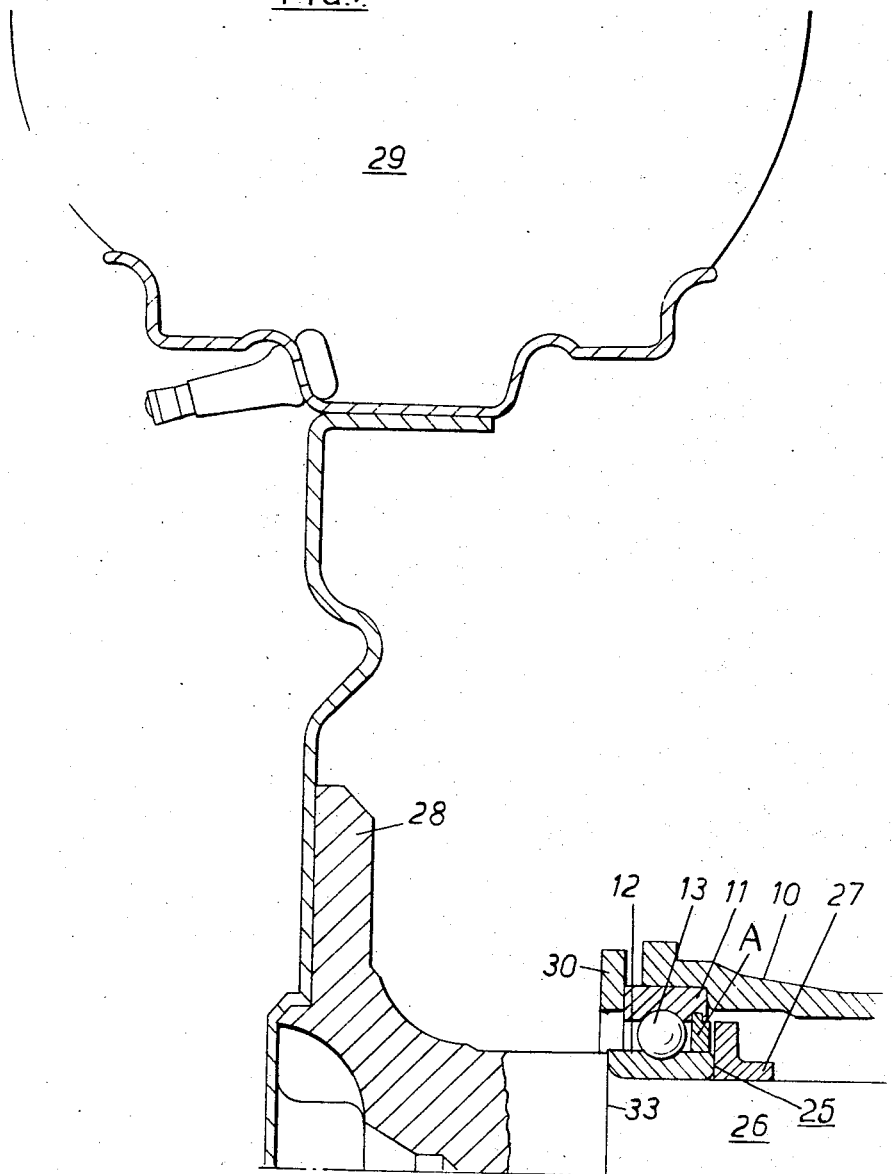

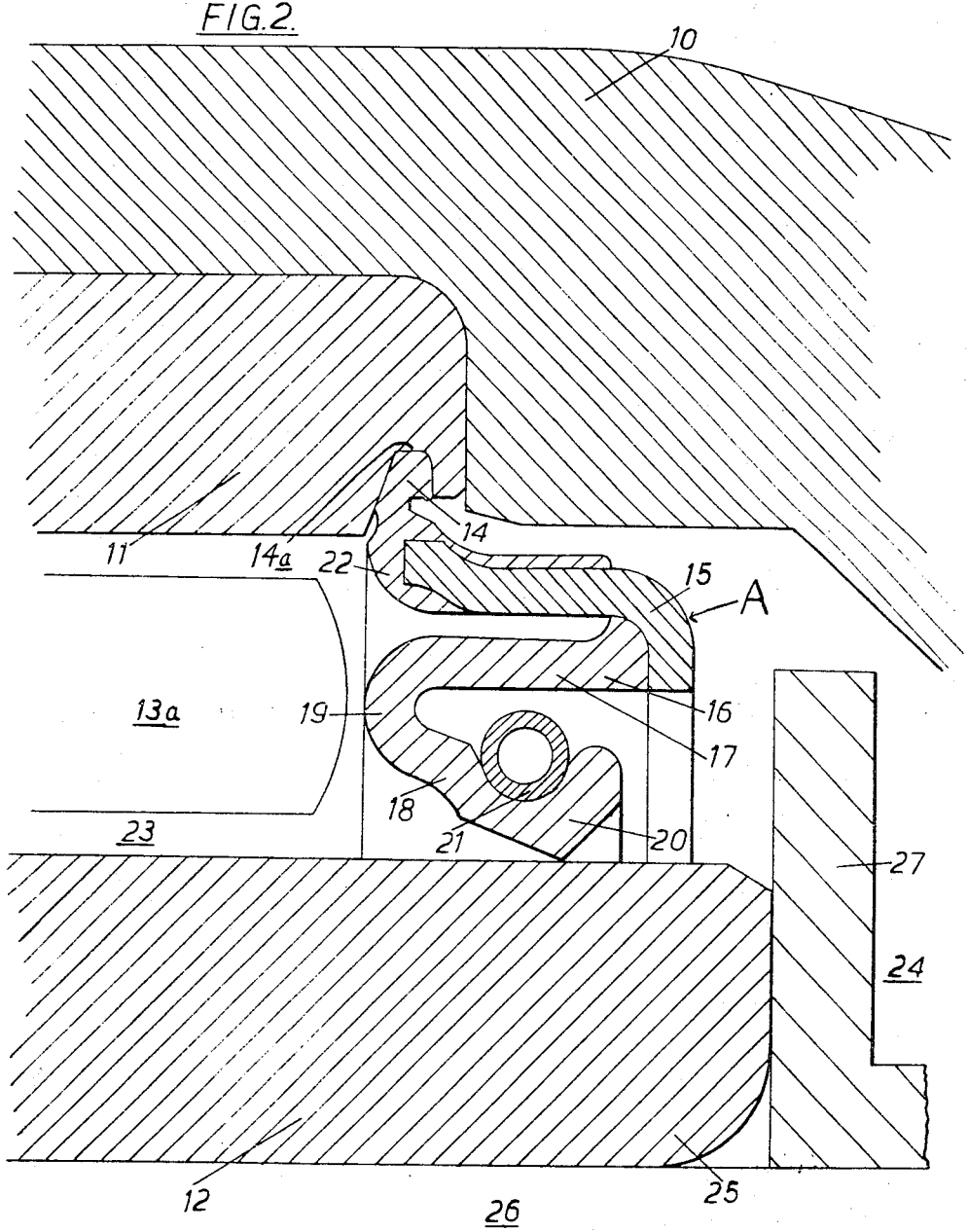

3,554,566
SEAL ASSEMBLY FOR RELATIVELY
ROTATABLE MEMBERS
Hans Bechthold and Hans-Jürgen Stössel, Russelsheim
(Main), Germany, assignors to General Motors Corporation, Detroit, Mich., a corporation of Delaware
Filed July 16, 1969, Ser. No. 842,128
Claims priority, application Germany, July 26, 1968,
1,995,813
Int. Cl. F16j 15/32
U.S. Cl. 277—153      2 Claims

ABSTRACT OF THE DISCLOSURE

A seal assembly for a pair of relatively rotatable members, in which one member includes an annular elastomeric seal element which is folded in accordion fashion to provide at least two diaphragm portions located radially one within the other. An annular sealing lip carried by one of the diaphragm portions is resiliently biased into sealing engagement with the surface to be sealed of the other member.

---

The invention relates to seal assemblies for relatively rotatable members, for example, to ball or roller bearing assemblies utilised in automobile wheel drive shafts. The principal object of the invention is to provide a seal assembly that will effectively seal fluid irrespective of any radial movements of a rotatable member having a limited axial width, for example a race of a ball or roller bearing.

The nature of the invention and the advantages thereof will be clear to those skilled in the art from the following detailed description of the preferred embodiment of the invention and the accompanying drawing thereof, wherein:

FIG. 1 is a schematic axial sectional view of an automobile drive shaft assembly incorporating a seal assembly according to the present invention; and FIG. 2 is an enlarged view of part of the sectional view shown in FIG. 1.

A specific embodiment is shown generally in FIG. 1, wherein a seal assembly according to the invention is incorporated in a wheel bearing installation in which a pair of relatively rotatable members, are constituted by the races of a ball bearing. More specifically, a ground-engaging tyre 29 is supported by a conventional wheel which is connected to a flange 28 of a rotatable drive shaft 26. The drive shaft 26 extends through, and is rotatable with respect to, a fixed hollow cylindrical outer casing 10. The bearing (shown schematically) includes an inner race 12 which is secured to the shaft 26 by a lock ring 27 which abuts an annular shoulder 25 of the race 12. Axial displacement of the inner race 12 in the opposite direction is prevented by a radial shoulder 33 formed on the shaft 26. A plurality of balls 13 are rotatably held by a conventional separator ring (not shown) in FIG. 1, between the relatively rotatable inner and outer races 12, 11.

As shown in greater detail in FIG. 2, an inner space 23 of the bearing assembly is sealed from an annular space 24 between the shaft 26 and the casing 10 by a resilient annular seal element A (shown only schematically in FIG. 1), which is folded in accordion fashion. The seal element A includes an annular sealing lip 20 which is biased by a garter spring 21 against the adjacent annular surface of the inner race 12. The sealing lip 20 is so formed to be resilient enough to be able to follow any radial movements of the shaft 26 (and therefore movement of the inner race 12) without deformations or gaps occurring between the sealing lip 20 and the inner race 12. In FIG. 2 the balls 13 of FIG. 1 are not shown, but reference 13a indicates a ball-separator ring not shown in FIG. 1.

As mentioned above, the annular seal element A is of integral construction and is formed from three parts: firstly, a sleeve 22 of elastomeric material having a radially outward support flange 14 which is press-fitted into an annular groove 14a formed in the inner annular surface of the outer race 11; secondly, a metal stiffener ring 15 which is bonded by vulcanization to the sleeve 22 and which extends axially almost as far as the annular shoulder 25 of the inner race 12, the stiffener ring being resiliently supported by the flange 14; and thirdly, an elastomeric diaphragm 16 which is vulcanized to the stiffener ring 15. The diaphragm 16 comprises two portions 17 and 18 radially one within the other, and are folded, as viewed in axial section, in accordion fashion. A connecting fold 19, generally U-shaped as viewed in axial section, connects the diaphragm portions 17 and 18, and is formed as short in length as possible, so as to prevent axial movement of the sealing lip 20 and of the diaphragm portions 17 and 18 which may cause fluttering movements of the sealing lip 20.

The diaphragm portions 17 and 18, and the sealing lip 20 are produced from any homogeneous elastomeric material, for example, a synthetic rubber composition.

The construction is considered advantageous because in operation, even with excessive axial or radial displacements of the rotating shaft 12, the sealing lip 20 owing to the accordion configuration of the seal element A remains in sealing contact with the adjacent annular surface of the inner race 12.

The detailed description of the preferred embodiment of the invention is for the purpose of explaining the principles thereof and is not considered as limiting or restricting the invention, since many modifications may be made by the exercise of skill in the art.

We claim:
1. A seal element for the space between relatively rotatable members, one of which includes a circumferential groove and the other of which includes a surface to be sealed comprising: an axially extending cylindrical stiffener ring; a radially outwardly extending annular flange of an elastomeric material at one end of the stiffener ring that is adapted to be retained in the circumferential groove for resiliently axially and radially positioning said stiffener ring relative to the surface to be sealed; an accordion folded diaphragm of an elastomeric material including a first portion attached at one end to the other end of said stiffener ring and extending axially therefrom toward said flange, a second portion radially spaced from said first portion, a circumferential U-shaped fold axially connecting said other end of said first portion and one end of the second portion; a sealing lip at the other end of the second portion, said sealing lip including a surface adapted to engage the surface to be sealed that is located axially between said fold and said other end of the stiffener ring, said sealing lip being radially spaced from the stiffener ring by said first portion and second portion whereby the latter and the fold accommodate radial movement of the sealing lip.

2. In a bearing seal for the space between an outer race having an annular circumferential groove and an inner race having a surface to be sealed, a seal element comprising: an axially extending cylindrical stiffener ring; an elastomeric annular flange outwardly radially extending from one end of the stiffener ring, said flange adapted to be retained in the circumferential groove for resiliently axially and radially positioning said stiffener ring relative to the inner race; an elastomeric diaphragm folded in accordion fashion, said diaphragm including a first portion attached to the other end of said stiffener ring and extending axially therefrom toward said flange, a second portion radially inwardly spaced from said first portion and having a lesser axial length than said first portion, a circumferential U-shaped fold axially connecting said other end of said first portion and one end of the second portion; a sealing lip at the other end of the second portion having a radially inwardly facing sealing surface engageable with the surface to be sealed that is located axially between said fold and said other end of the stiffener ring, said sealing lip being radially inwardly spaced from the stiffener ring by said first portion and second portion of said diaphragm thereby accommodating radial movements of the inner race with the fold serving to maintain the axial position of the sealing surface.

References Cited

UNITED STATES PATENTS

| 2,797,944 | 7/1957 | Riesing | 277—153 |
| 2,830,858 | 4/1958 | Moorman et al. | 277—153X |
| 2,873,153 | 2/1959 | Haynie | 277—153X |

FOREIGN PATENTS

| 78,715 | 7/1955 | Netherlands | 277—153 |
| 815,284 | 8/1951 | Germany | 277—153 |

LAVERNE D. GEIGER, Primary Examiner

ROBERT I. SMITH, Assistant Examiner